United States Patent
Elkovitch et al.

(10) Patent No.: US 7,678,295 B2
(45) Date of Patent: Mar. 16, 2010

(54) REINFORCED POLY(ARYLENE ETHER)/POLYAMIDE COMPOSITION AND ARTICLE COMPRISING THE FOREGOING

(75) Inventors: Mark D. Elkovitch, Delmar, NY (US); Sai-Pei Ting, Slingerlands, NY (US)

(73) Assignee: Sabic Innovative Plastics IP B.V. (NL)

( * ) Notice: Subject to any disclaimer, the term of this patent is extended or adjusted under 35 U.S.C. 154(b) by 620 days.

(21) Appl. No.: 11/549,338

(22) Filed: Oct. 13, 2006

(65) Prior Publication Data

US 2008/0090953 A1   Apr. 17, 2008

(51) Int. Cl.
*H01B 1/00* (2006.01)
*H01B 1/04* (2006.01)
*B29D 22/00* (2006.01)

(52) U.S. Cl. .................. 252/500; 428/35.7; 252/502; 252/511

(58) Field of Classification Search .............. 252/500, 252/502; 428/35.7
See application file for complete search history.

(56) References Cited

U.S. PATENT DOCUMENTS

| | | | |
|---|---|---|---|
| 3,379,792 A | 4/1968 | Finholt | |
| 4,772,664 A | 9/1988 | Ueda et al. | |
| 4,863,996 A | 9/1989 | Nakazima et al. | |
| 4,877,847 A * | 10/1989 | Masu et al. | 525/397 |
| 4,997,612 A * | 3/1991 | Gianchandai et al. | 264/211 |
| 5,132,365 A | 7/1992 | Gallucci | |
| 5,723,539 A * | 3/1998 | Gallucci et al. | 525/63 |
| 6,593,411 B2 | 7/2003 | Koevoets et al. | |
| 7,413,684 B2 * | 8/2008 | Fishburn et al. | 252/500 |
| 2003/0166762 A1 | 9/2003 | Koevoets et al. | |
| 2004/0251578 A1 | 12/2004 | Matthijssen et al. | |
| 2006/0108567 A1 * | 5/2006 | Charati et al. | 252/500 |
| 2006/0183817 A1 * | 8/2006 | Keulen et al. | 523/351 |

FOREIGN PATENT DOCUMENTS

| | | |
|---|---|---|
| EP | 0597648 | 5/1994 |
| EP | 0685527 | 12/1995 |
| EP | 0943659 | 9/1999 |

OTHER PUBLICATIONS

ISO 180, "Plastics-Determination of Izod impact strength", Dec. 15, 2000, 16 pages.
ISO 306, "Plastics-Thermoplastic materials-Determination of Vicat softening temperature (VST)", Jul. 15, 2004, 16 pages.
ISO 527-2, "Plastics-Determination of tensile properties-Part 2: Test conditions for moulding and extrusion plastics", Jun. 15, 1993, 8 pages.
International Search Report for International Application No. PCT/US2007/075846, mailed Dec. 17, 2007, 5 pages.
Written Opinion for International Application No. PCT/US2007/075846, mailed Dec. 17, 2007, 6 pages.

* cited by examiner

*Primary Examiner*—Mark Kopec
*Assistant Examiner*—Jaison P Thomas
(74) *Attorney, Agent, or Firm*—Cantor Colburn LLP

(57) ABSTRACT

A thermoplastic composition comprising a compatibilized blend of poly(arylene ether) and polyamide; a reinforcing fiber; and an electrically conductive filler. Greater than 50 weight percent of the polyamide, based on the total weight of the polyamide, is polyamide-6. The thermoplastic composition is useful in articles that are painted by electrostatic painting.

49 Claims, 2 Drawing Sheets

REINFORCED POLY(ARYLENE ETHER)/POLYAMIDE COMPOSITION AND ARTICLE COMPRISING THE FOREGOING

BACKGROUND OF INVENTION

Described herein is a reinforced thermoplastic composition comprising a compatibilized blend of poly(arylene ether) and polyamide. More specifically, described herein is a reinforced, electrically conductive, thermoplastic composition comprising a compatibilized blend of poly(arylene ether) and polyamide.

Plastic materials are used in a wide variety of articles. In order for a plastic material to be used in an article the plastic material needs the desired combination of physical characteristics required for that article. The plastic material for use in some articles needs high strength, heat resistance, and enough conductivity so that the plastic material can be painted using electrostatic painting techniques. In electrostatic painting charged paint particles are attracted to a grounded article. In order to achieve the desired combination of high strength, heat resistance, and conductivity the plastic material can contain an electrically conductive filler and a reinforcing fiber such as glass fiber. However, plastic materials containing both electrically conductive filler and reinforcing fiber can show a very rough, highly textured finish. This is a problem for some types of articles because a smooth, glossy painted surface is desired. A smooth, glossy painted surface can be achieved starting from a rough, highly textured molded article by using several coats of primer, paint and sometimes clear coat as well. Unfortunately so many layers increase the cost of the article and the time required to make the article. Hence, there is a need in the art for plastic materials containing electrically conductive filler and reinforcing fiber which have a smooth surface appearance after minimal painting and in some cases after only a single paint layer.

BRIEF DESCRIPTION OF THE INVENTION

The aforementioned need is met, in one aspect, by a thermoplastic composition comprising:
a compatibilized blend of poly(arylene ether) and polyamide;
10 to 40 weight percent, based on the total weight of the composition, of a reinforcing fiber; and
an electrically conductive filler,
wherein the compatibilized blend has a weight ratio of poly(arylene ether) to polyamide of 0.25 to 0.40 and
wherein greater than 50 weight percent of the polyamide, based on the total weight of the polyamide, is polyamide-6. In some embodiments greater than or equal to 75 weight percent, or, more specifically, greater than or equal to 85 weight percent, or, even more specifically, greater than or equal to 95 weight percent of the polyamide is polyamide-6.

In some embodiments, a thermoplastic composition comprises:
a compatibilized blend of poly(arylene ether) and polyamide;
10 to 30 weight percent, based on the total weight of the composition, of reinforcing fiber; and
an electrically conductive filler;
wherein the weight ratio of the combined weight of poly(arylene ether) and reinforcing fiber to the weight of the polyamide is 0.5 to 0.9, and
wherein greater than 50 weight percent of the polyamide is polyamide-6. In some embodiments greater than or equal to 75 weight percent, or, more specifically, greater than or equal to 85 weight percent, or, even more specifically, greater than or equal to 95 weight percent of the polyamide is polyamide-6.

In some embodiments an article comprises a paint film disposed on at least a portion of a thermoplastic section. The thermoplastic section is made from a thermoplastic composition comprising:
a compatibilized blend of poly(arylene ether) and polyamide;
10 to 40 weight percent, based on the total weight of the composition, of a reinforcing fiber; and
an electrically conductive filler,
wherein the compatibilized blend has a weight ratio of poly(arylene ether) to polyamide of 0.25 to 0.40;
wherein greater than 50 weight percent of the polyamide, based on the total weight of the polyamide, is polyamide-6. The paint film has a thickness of 38 micrometers to 178 micrometers. The article, with the paint film, has a distinctness of image (DOI) of greater than or equal to 85. In some embodiments the paint film is produced by electrostatic painting using liquid particles. In some embodiments the paint film is produced by powder coating.

In some embodiments an article comprises a paint film disposed on at least a portion of a thermoplastic section. The thermoplastic section is made from a thermoplastic composition comprising:
a compatibilized blend of poly(arylene ether) and polyamide;
10 to 30 weight percent, based on the total weight of the composition, of reinforcing fiber; and
an electrically conductive filler;
wherein the weight ratio of the combined weight of poly(arylene ether) and reinforcing fiber to the weight of the polyamide is 0.5 to 0.9, and
wherein greater than 50 weight percent of the polyamide is polyamide-6. The paint film has a thickness of 38 micrometers to 178 micrometers. The article, with the paint film, has a distinctness of image (DOI) of greater than or equal to 85. In some embodiments the paint film is produced by electrostatic painting using liquid particles. In some embodiments the paint film is produced by powder coating.

In some embodiments, a method of improving the surface appearance of an unpainted article comprises:
injection molding a thermoplastic composition to form an unpainted article,
wherein the unpainted article has no visually detectable fiber read through at a distance of 1 meter in bright sunlight, and
wherein the thermoplastic composition comprises
a compatibilized blend of poly(arylene ether) and polyamide;
10 to 40 weight percent, based on the total weight of the composition, of a reinforcing fiber; and
an electrically conductive filler,
wherein the compatibilized blend has a weight ratio of poly(arylene ether) to polyamide of 0.25 to 0.40; and
wherein greater than 50 weight percent of the polyamide, based on the total weight of the polyamide, is polyamide-6.

In some embodiments, a method of improving the surface appearance of an unpainted article comprises:
injection molding a thermoplastic composition to form an unpainted article,
wherein the unpainted article has no visually detectable fiber read through at a distance of 1 meter in bright sunlight, and wherein the thermoplastic composition comprises
a compatibilized blend of poly(arylene ether) and polyamide;
10 to 30 weight percent, based on the total weight of the composition, of reinforcing fiber; and
an electrically conductive filler;
wherein the weight ratio of the combined weight of poly(arylene ether) and reinforcing fiber to the weight of the polyamide is 0.5 to 0.9, and
wherein greater than 50 weight percent of the polyamide is polyamide-6.

DETAILED DESCRIPTION

As mentioned above there is a need for plastic materials containing electrically conductive filler and reinforcing fiber which have a smooth surface appearance after minimal painting. This need is met by certain thermoplastic composition(s) comprising a compatibilized blend of poly(arylene ether) and polyamide, 10 to 40 weight percent of reinforcing fiber, and electrically conductive filler. In some embodiments, excellent surface appearance after molding and electrostatic painting was achieved by using greater than 50 weight percent, based on the total weight of polyamide, of polyamide-6 in the composition and choosing the amounts of poly(arylene ether) and polyamide such that the weight ratio of poly(arylene ether) to polyamide is 0.25 to 0.40. In some embodiments, excellent surface appearance after molding and electrostatic painting was achieved by using greater than 50 weight percent, based on the total weight of polyamide, of polyamide-6 in the composition and choosing the amounts of poly(arylene ether), reinforcing fiber, and polyamide such that the weight ratio of the combined weight of poly(arylene ether) and glass fiber to the weight of the polyamide is 0.5 to 0.9.

Figure 1:
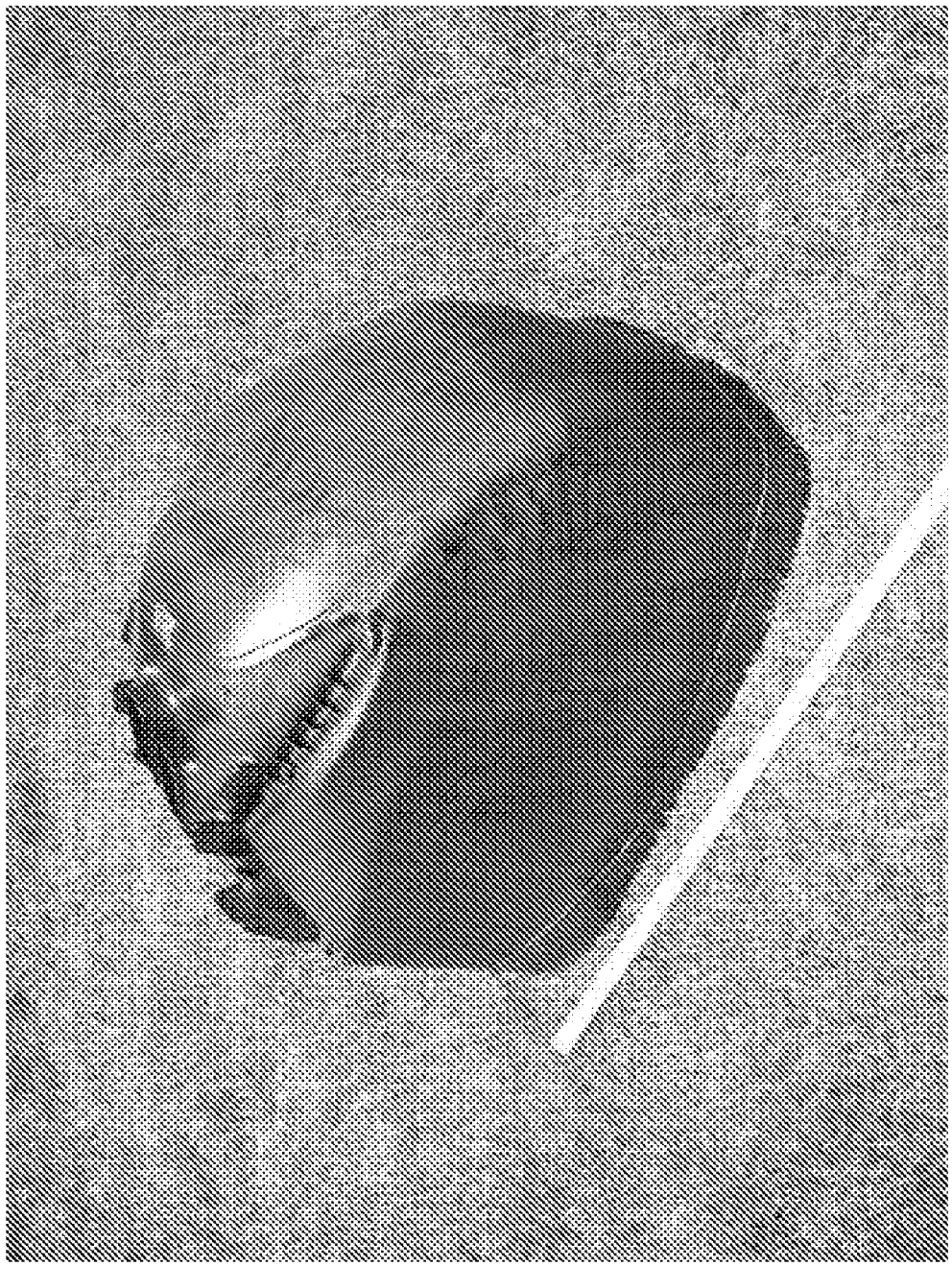
FIGS. 1 and 2 are photographs of unpainted, injection molded articles.
Figure 2:
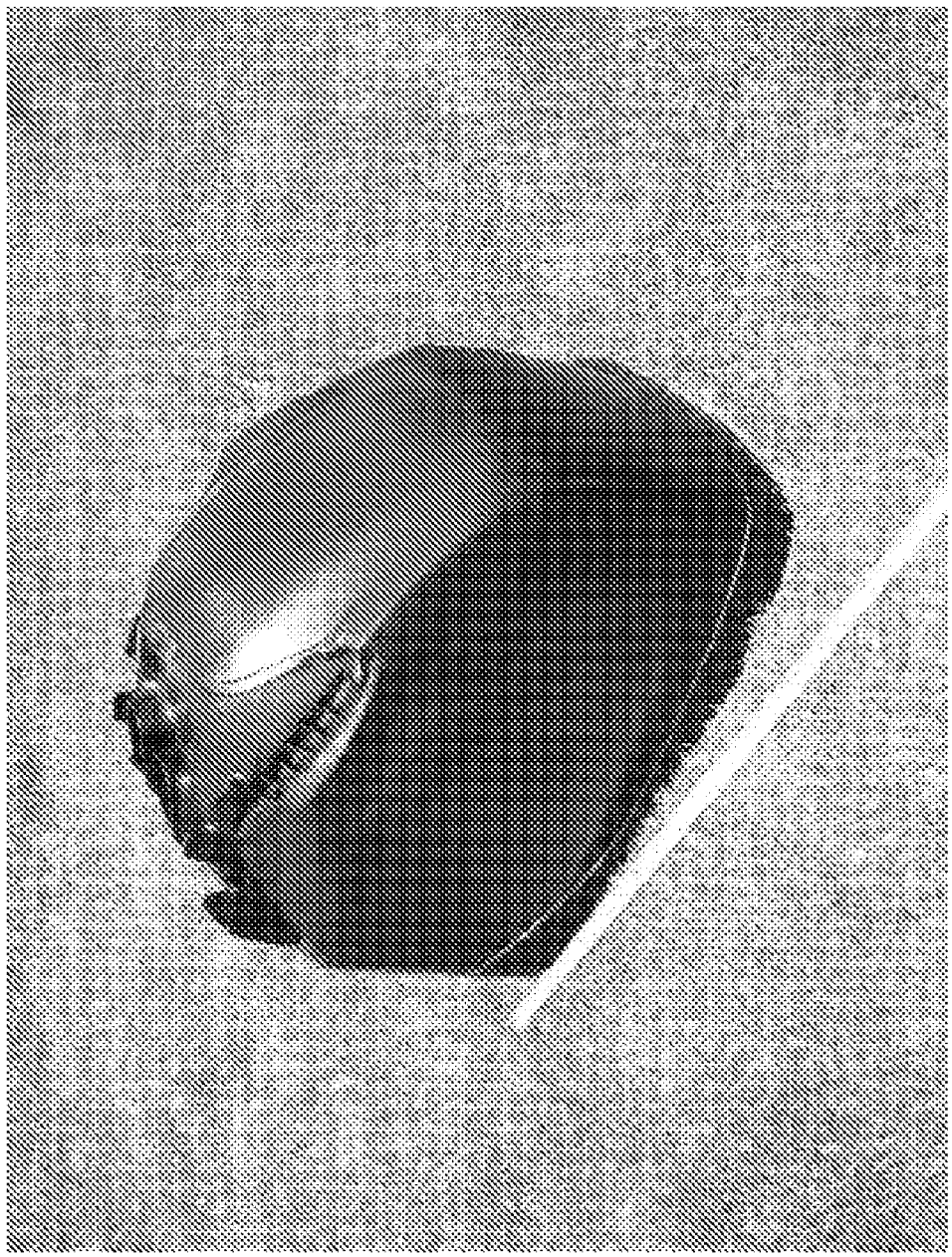

Notably the unpainted molded article has no visually detectable fiber read through when viewed in bright sunlight at a distance of 1 meter. FIG. 1 is a photograph of an unpainted molded article made from a comparative thermoplastic composition containing 20 weight percent glass fiber, based on the total weight of the composition. The comparative thermoplastic composition is NORYL GTX 820 which contains polyamide-6,6. This molded article is "as molded" and has not been subjected to any surface modifications. FIG. 2 is a photograph of an unpainted molded article made from a thermoplastic composition as described herein and comprising 20 weight percent glass fiber, based on the total weight of the composition. This molded article is "as molded" and has not been subjected to any surface modifications. The photographs were taken in bright sunlight at a distance of approximately 1 meter. Fiber read through is clearly evident in FIG. 1 whereas fiber read through is absent in FIG. 2.

Additionally, the inclusion of reinforcing fiber, in particular glass fiber, yields a composition that has smaller than expected specific volume resistivity (greater than expected conductivity) when compared to comparable compositions that do not contain reinforcing fiber. In some embodiments the reinforced composition has a volume resistivity that is less than 50% of the volume resistivity of a comparable non-reinforced composition. A "comparable non-reinforced composition" is defined as having the same composition as the reinforced composition but without the reinforcing fiber. The components of the comparable non-reinforced composition are present in the same amounts relative to each other as in the reinforced composition. For example, a reinforced composition contains 30 weight percent (wt %) poly(arylene ether), 6 wt % impact modifier, 10 wt % glass fiber, 2 wt % conductive carbon black, and 52 wt % polyamide-6, with the weight percents based on the total weight of the composition. A comparable non-reinforced composition would contain 33 wt % poly(arylene ether), 7 wt % impact modifier, 2 wt % conductive carbon black, and 58 wt % polyamide-6, with the weight percents based on the total weight of the composition.

Specific volume resistivity (SVR) is a measure of the leakage current through a volume of material. It is defined as the electrical resistance through a one-centimeter cube of material and is expressed in ohm-centimeter (ohm-cm). The lower the specific volume resistivity of a material, the more conductive the material is. In some embodiments the thermoplastic composition has a specific volume resistivity less than or equal to $6 \times 10^6$ ohm-cm, or, more specifically, less than or equal to $1 \times 10^5$ ohm-cm, or, even more specifically, less than or equal to $1 \times 10^4$ ohm-cm. The specific volume resistivity can be greater than or equal to 1 ohm-cm, or more specifically greater than or equal to $1 \times 10^2$ ohm-cm. Specific volume resistivity can be determined as described in the Examples.

Specific volume resistivity (also referred to herein as volume resistivity) is distinct and different from surface resistivity. Resistivity, both surface and volume, can be correlated to the distribution of electrically conductive filler in the resin matrix. Surface resistivity is a measure of the resistivity of a surface of an article and can only be correlated with the distribution of electrically conductive filler in a matrix at or near the surface of an article. In contrast, volume resistivity is a measure of the resistivity of the volume of an article—not just the surface. The distribution of electrically conductive filler at the surface of an article can vary significantly from the distribution of electrically conductive filler throughout the volume of an article or composition, particularly in reinforced compositions.

The thermoplastic composition has high impact strength. Impact strength can be measured using the Notched Izod (NI) impact test in accordance with ISO 180/1A ($3^{rd}$ edition, 2000) at 23° C. using injection molded specimens having dimensions of 80 millimeters (mm)×10 mm×4 mm. A 5.5 Joule (J) hammer weight is allowed to freely fall to break the clamped notched samples with the notch facing the hammer. Prior to testing the specimens are conditioned at 23° C. and 50% relative humidity for 8 hours or more in accordance with ISO 291. Impact strength values are the arithmetic mean of 5 samples. In some embodiments the thermoplastic composition has a NI value of 5 to 75 kilojoules per square meter ($kJ/m^2$). Within this range the NI can be greater than or equal to 8 $kJ/m^2$, or, more specifically, greater than or equal to 10 $kJ/m^2$ when determined at 23° C.

The thermoplastic composition has a high heat resistance as indicated by a Vicat softening temperature (VST) of 170° C. to 230° C. Within this range the VST can be greater than or equal to 180° C., or, more specifically, greater than or equal to 190° C. A VST greater than or equal to 170° C. is indicative that the composition has adequate heat performance for electrostatic painting. The VST is determined using ISO 306 ($4^{th}$ edition, 2004) with a 50 Newton force and a heating rate of 120° C. per hour (method B120). The reported value is the arithmetic mean of two samples. Prior to testing the specimens are conditioned at 23° C. and 50% relative humidity for 8 hours or more in accordance with ISO 291. The injection molded samples have dimensions of 80 mm×10 mm×4 mm.

In some embodiments, the composition has a nominal tensile strain at break of 1% to 15% as determined by ISO 527-2

(1993 revision). Within this range the nominal tensile strain at break can be greater than or equal to 2%, or more specifically, greater than or equal to 5%. Nominal tensile strain at break is determined using 5 type 1A samples made by injection molding. The reported value is the arithmetic mean of the 5 samples. Prior to testing the samples were conditioned at 23° C. and 50% relative humidity for 48 hours. The samples were tested at 23° C. and 50% relative humidity using a testing speed of 5 millimeters per minute.

In some embodiments the composition has a tensile strength of 95 to 220 MegaPascals (MPa). Within this range the tensile strength can be greater than or equal to 100 MPa, or, more specifically, greater than or equal to 130 MPa. Tensile strength is determined according to ISO 527-2 (1993 revision) as described above.

In some embodiments the composition has a tensile modulus of 3,500 to 15,000 MPa. Within this range the tensile strength can be greater than or equal to 3,800 MPa, or, more specifically, greater than or equal to 4,000 MPa. Tensile modulus is determined according to ISO 527-2 (1993 revision) as described above.

As mentioned above the thermoplastic composition comprises a compatibilized poly(arylene ether)/polyamide blend. Poly(arylene ether) comprises repeating structural units of formula (I)

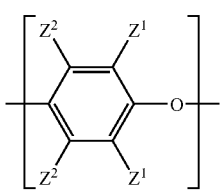

(I)

wherein for each structural unit, each $Z^1$ is independently halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each $Z^2$ is independently hydrogen, halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms.

As used herein, the term "hydrocarbyl", whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. However, when the hydrocarbyl residue is described as "substituted", it can contain heteroatoms over and above the carbon and hydrogen members of the substituent residue. Thus, when specifically described as substituted, the hydrocarbyl residue can also contain halogen atoms, nitro groups, cyano groups, carbonyl groups, carboxylic acid groups, ester groups, amino groups, amide groups, sulfonyl groups, sulfoxyl groups, sulfonamide groups, sulfamoyl groups, hydroxyl groups, alkoxyl groups, or the like, and it can contain heteroatoms within the backbone of the hydrocarbyl residue.

The poly(arylene ether) can comprise molecules having aminoalkyl-containing end group(s), typically located in an ortho position to the hydroxy group. Also frequently present are tetramethyl diphenylquinone (TMDQ) end groups, typically obtained from reaction mixtures in which tetramethyl diphenylquinone by-product is present.

The poly(arylene ether) can be in the form of a homopolymer; a copolymer; a graft copolymer; an ionomer; or a block copolymer; as well as combinations comprising at least one of the foregoing. Poly(arylene ether) includes polyphenylene ether comprising 2,6-dimethyl-1,4-phenylene ether units optionally in combination with 2,3,6-trimethyl-1,4-phenylene ether units.

The poly(arylene ether) can be prepared by the oxidative coupling of monohydroxyaromatic compound(s) such as 2,6-xylenol and/or 2,3,6-trimethylphenol. Catalyst systems are generally employed for such coupling; they can contain heavy metal compound(s) such as a copper, manganese or cobalt compound, usually in combination with various other materials such as a secondary amine, tertiary amine, halide or combination of two or more of the foregoing.

The poly(arylene ether) can have a number average molecular weight of 3,000 to 40,000 grams per mole (g/mol) and a weight average molecular weight of 5,000 to 80,000 g/mol, as determined by gel permeation chromatography using monodisperse polystyrene standards, a styrene divinyl benzene gel at 40° C. and samples having a concentration of 1 milligram per milliliter of chloroform. The poly(arylene ether) or combination of poly(arylene ether)s can have an initial intrinsic viscosity of 0.25 to 0.6 deciliters per gram (dl/g), as measured in chloroform at 25° C. Initial intrinsic viscosity is defined as the intrinsic viscosity of the poly (arylene ether) prior to melt mixing with the other components of the composition and final intrinsic viscosity is defined as the intrinsic viscosity of the poly(arylene ether) after melt mixing with the other components of the composition. As understood by one of ordinary skill in the art, the viscosity of the poly(arylene ether) can be up to 30% higher after melt mixing. The percentage of increase can be calculated by (final intrinsic viscosity—initial intrinsic viscosity)/initial intrinsic viscosity. Determining an exact ratio, when two intrinsic viscosities are used, will depend somewhat on the exact intrinsic viscosities of the poly(arylene ether) used and the ultimate physical properties that are desired.

In some embodiments the poly(arylene ether) has a glass transition temperature (Tg) as determined by differential scanning calorimetry (DSC at 20° C./minute ramp), of 160° C. to 250° C. Within this range the Tg can be greater than or equal to 180° C., or, more specifically, greater than or equal to 200° C. Also within this range the Tg can be less than or equal to 240° C., or, more specifically, less than or equal to 230° C.

The composition comprises poly(arylene ether) in an amount of 10 to 35 weight percent (wt %), based on the total weight of the thermoplastic composition. Within this range, the poly(arylene ether) can be present in an amount greater than or equal to 15 weight percent. Also within this range the poly(arylene ether) can be present in an amount less than or equal to 30 weight percent.

Polyamide resins, also known as nylons, are characterized by the presence of an amide group (—C(O)NH—), and are described in U.S. Pat. No. 4,970,272. Exemplary polyamide resins include, but are not limited to, polyamide-6; polyamide-6,6; polyamide-4; polyamide-4,6; polyamide-12; polyamide-6,10; polyamide-6,9; polyamide-6,12; amorphous polyamides; polyphthalamides; polyamide-6,6/6T and polyamide-6,6/6T with triamine contents less than 0.5 weight percent; polyamide-9T and combinations comprising one or more of the foregoing polyamides. The composition can comprise two or more polyamides, for example the polyamide can comprises polyamide-6 and polyamide-6,6. In some embodiments the polyamide resin or combination of polyamide resins has a melting point (Tm) greater than or equal to 171° C. When the polyamide comprises a super tough polyamide, i.e. a rubber-toughed polyamide, the composition may or may not contain a separate impact modifier.

The polyamide used in the compatibilized blend of poly (arylene ether) and polyamide comprises polyamide-6. Polyamide-6 may be the only polyamide used or a combination of polyamides may be used as long as the amount of polyamide-6 is greater than 50 weight percent based on the total weight of polyamide. In some embodiments greater than or equal to 75 weight percent, or, more specifically, greater than or equal to 85 weight percent, or, even more specifically, greater than or equal to 95 weight percent of the polyamide is polyamide-6.

Polyamide-6 is the polymer that results from the polymerization of caprolactam. Polyamide-6 has the structure shown in formula (II):

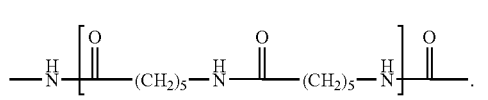

In some embodiments, polyamide-6 having an intrinsic viscosity of up to 400 milliliters per gram (ml/g) is used, or, more specifically, having a viscosity of 90 to 350 ml/g, or, even more specifically, having a viscosity of 110 to 240 ml/g, as measured in a 0.5 wt % solution in 96 wt % sulfuric acid in accordance with ISO 307.

In some embodiments the polyamide-6 can have a relative viscosity of up to 6, or, more specifically, a relative viscosity of 1.89 to 5.43, or, even more specifically, a relative viscosity of 2.16 to 3.93. Relative viscosity is determined according to DIN 53727 in a 1 wt % solution in 96 wt % sulfuric acid.

In some embodiments, the polyamide or combination of polyamides have an amine end group concentration greater than or equal to 35 microequivalents amine end group per gram of polyamide (µeq/g) as determined by titration with HCl. Within this range, the amine end group concentration can be greater than or equal to 40 µeq/g, or, more specifically, greater than or equal to 45 µeq/g. The maximum amount of amine end groups is typically determined by the polymerization conditions and molecular weight of the polyamide. Amine end group content can be determined by dissolving the polyamide in a suitable solvent, optionally with heat. The polyamide solution is titrated with 0.01 Normal hydrochloric acid (HCl) solution using a suitable indication method. The amount of amine end groups is calculated based the volume of HCl solution added to the sample, the volume of HCl used for the blank, the molarity of the HCl solution and the weight of the polyamide sample.

The composition comprises polyamide in an amount sufficient to form a continuous phase or co-continuous phase of the composition and to have a weight ratio of poly(arylene ether) to polyamide of 0.25 to 0.40. The amount of polyamide can be 35 to 70 weight percent, based on the total weight of the composition. Within this range, the polyamide can be present in an amount greater than or equal to 37 weight percent. Also within this range, the polyamide can be present in an amount less than or equal to 65 weight percent.

When used herein, the expression "compatibilizing agent" refers to polyfunctional compounds which interact with the poly(arylene ether), the polyamide resin, or both. This interaction may be chemical (e.g., grafting) and/or physical (e.g., affecting the surface characteristics of the dispersed phases). In either instance the resulting compatibilized poly(arylene ether)/polyamide composition appears to exhibit improved compatibility, particularly as evidenced by enhanced impact strength, mold knit line strength and/or elongation. As used herein, the expression "compatibilized poly(arylene ether)/ polyamide blend" refers to those compositions which have been physically and/or chemically compatibilized with an agent as discussed above, as well as those compositions which are physically compatible without such agents, as taught in U.S. Pat. No. 3,379,792.

As understood by one of ordinary skill in the art, poly (arylene ether) and polyamide, when combined, form an immiscible blend. Immiscible blends have either a continuous phase and a dispersed phase or two co-continuous phases. When a continuous phase and a dispersed phase are present the size of the particles of the dispersed phase can be determined using electron microscopy. In a compatibilized poly (arylene ether)/polyamide blend the average diameter of the dispersed phase particles (poly(arylene ether)) is decreased compared to non-compatibilized poly(arylene ether)/polyamide blends. For example, compatibilized poly(arylene ether)/polyamide blends have an average poly(arylene ether) particle diameter less than or equal to 10 micrometers. In some embodiments the average particle diameter is greater than or equal to 0.05 micrometers. The average particle diameter in a pelletized blend can be smaller than in a molded article but in either case the average particle diameter is less than or equal to 10 micrometers. Determination of average particle diameter is known in the art and is taught, for example, in U.S. Pat. Nos. 4,772,664 and 4,863,996.

Examples of the various compatibilizing agents that can be employed include: liquid diene polymers, epoxy compounds, oxidized polyolefin wax, quinones, organosilane compounds, polyfunctional compounds, functionalized poly(arylene ether) and combinations comprising one or more of the foregoing. Compatibilizing agents are further described in U.S. Pat. Nos. 5,132,365 and 6,593,411 as well as U.S. Patent Application No. 2003/0166762.

In some embodiments, the compatibilizing agent comprises a polyfunctional compound. Polyfunctional compounds which can be employed as a compatibilizing agent are of three types. The first type of polyfunctional compounds are those having in the molecule both (a) a carbon-carbon double bond or a carbon-carbon triple bond and (b) at least one carboxylic acid, anhydride, amide, ester, imide, amino, epoxy, orthoester, or hydroxy group. Examples of such polyfunctional compounds include maleic acid; maleic anhydride; fumaric acid; glycidyl acrylate, itaconic acid; aconitic acid; maleimide; maleic hydrazide; reaction products resulting from a diamine and maleic anhydride, maleic acid, fumaric acid, etc.; dichloro maleic anhydride; maleic acid amide; unsaturated dicarboxylic acids (e.g., acrylic acid, butenoic acid, methacrylic acid, t-ethylacrylic acid, pentenoic acid); decenoic acids, undecenoic acids, dodecenoic acids, linoleic acid, etc.); esters, acid amides or anhydrides of the foregoing unsaturated carboxylic acids; unsaturated alcohols (e.g. alkyl alcohol, crotyl alcohol, methyl vinyl carbinol, 4-pentene-1-ol, 1,4-hexadiene-3-ol, 3-butene-1,4-diol, 2,5-dimethyl-3-hexene-2,5-diol and alcohols of the formula $C_nH_{2n-5}OH$, $C_nH_{2n-7}OH$ and $C_nH_{2n-9}OH$, wherein n is 5 to 30; unsaturated amines resulting from replacing from replacing the —OH group(s) of the above unsaturated alcohols with NH$_2$ groups; functionalized diene polymers and copolymers; and combinations comprising one or more of the foregoing. In some embodiments, the compatibilizing agent comprises maleic anhydride, fumaric acid, or a combination of maleic anhydride and fumaric acid.

The second type of polyfunctional compatibilizing agents are characterized as having both (a) a group represented by the formula (OR) wherein R is hydrogen or an alkyl, aryl, acyl, or carbonyl dioxy group and (b) at least two groups each of which can be the same or different selected from carboxylic acid, acid halide, anhydride, acid halide anhydride, ester, orthoester, amide, imido, amino, and various salts thereof. Exemplary of this group of compatibilizers are the aliphatic polycarboxylic acids, acid esters and acid amides represented by the formula

wherein $R^V$ is a linear or branched chain, saturated aliphatic hydrocarbon having 2 to 20, or, more specifically, 2 to 10, carbon atoms; $R^I$ is hydrogen or an alkyl, aryl, acyl, or carbonyl dioxy group having 1 to 10, or, more specifically, 1 to 6, or, even more specifically, 1 to 4 carbon atoms; each $R^{II}$ is independently hydrogen or an alkyl or aryl group having 1 to 20, or, more specifically, 1 to 10 carbon atoms; each $R^{III}$ and $R^{IV}$ are independently hydrogen or an alkyl or aryl group having 1 to 10, or, more specifically, 1 to 6, or, even more specifically, 1 to 4, carbon atoms; m is equal to 1 and (n+s) is greater than or equal to 2, or, more specifically, equal to 2 or 3, and n and s are each greater than or equal to zero and wherein (OR$^I$) is alpha or beta to a carbonyl group and at least two carbonyl groups are separated by 2 to 6 carbon atoms. Obviously, $R^I$, $R^{II}$, $R^{III}$, and $R^{IV}$ cannot be aryl when the respective substituent has less than 6 carbon atoms.

Suitable polyfunctional compatibilizing agents of the second type also include, for example, citric acid, malic acid, agaricic acid; including the various commercial forms thereof, such as for example, the anhydrous and hydrated acids; and combinations comprising one or more of the foregoing. In some embodiments, the compatibilizing agent comprises citric acid. Illustrative of esters useful herein include, for example, acetyl citrate, mono- and/or distearyl citrates, and the like. Suitable amides useful herein include, for example, N,N'-diethyl citric acid amide; N-phenyl citric acid amide; N-dodecyl citric acid amide; N,N'-didodecyl citric acid amide; N-dodecyl malic acid, and combinations comprising one or more of the foregoing amides. Derivates include the salts thereof, including the salts with amines and the alkali and alkaline metal salts. Exemplary of suitable salts include calcium malate, calcium citrate, potassium malate, and potassium citrate.

The third type of polyfunctional compatibilizing agents are characterized as having in the molecule both (a) an acid halide group and (b) at least one carboxylic acid, anhydride, ester, epoxy, orthoester, or amide group. Examples of compatibilizers within this group include trimellitic anhydride acid chloride, chloroformyl succinic anhydride, chloro formyl succinic acid, chloroformyl glutaric anhydride, chloroformyl glutaric acid, chloroacetyl succinic anhydride, chloroacetylsuccinic acid, trimellitic acid chloride, and chloroacetyl glutaric acid. In some embodiments, the compatibilizing agent comprises trimellitic anhydride acid chloride.

The thermoplastic composition is produced by melt blending the components. The foregoing compatibilizing agents can be added directly to the melt blend or pre-reacted with either or both of the poly(arylene ether) and polyamide, as well as with other resinous materials employed in the preparation of the composition. With many of the foregoing compatibilizing agents, particularly the polyfunctional compounds, even greater improvement in compatibility is found when at least a portion of the compatibilizing agent is pre-reacted, either in the melt or in a solution of a suitable solvent, with all or a part of the poly(arylene ether). It is believed that such pre-reacting can cause the compatibilizing agent to react with the polymer and, consequently, functionalize all or part of the poly(arylene ether). For example, the poly(arylene ether) can be pre-reacted with maleic anhydride to form an anhydride functionalized polyphenylene ether which when melt blended with polyamide and optionally non-functionalized poly(arylene ether) results in a compatibilized poly(arylene ether)/polyamide blend.

Where the compatibilizing agent is employed in the preparation of the compositions, the amount used will be dependent upon the specific compatibilizing agent chosen and the specific polymeric system to which it is added as well as the desired properties of the resultant composition.

The thermoplastic composition can optionally comprise an impact modifier. One type of useful impact modifier comprises one or more moieties selected from the group consisting of carboxylic acid, anhydride, epoxy, oxazoline, and ester. When the impact modifier comprises a carboxylic acid moiety the carboxylic acid moiety can be neutralized with an ion, such as zinc or sodium. It can be an alkylene-alkyl(meth)acrylate copolymer and the alkylene groups can have 2 to 6 carbon atoms and the alkyl group of the alkyl(meth)acrylate can have 1 to 8 carbon atoms. This type of polymer can be prepared by copolymerizing an olefin, for example, ethylene, propylene, or a combination of ethylene and propylene, with various (meth)acrylate monomers and/or various maleic-based monomers. The term (meth)acrylate refers to both the acrylate as well as the corresponding methacrylate analogue. Included within the term (meth)acrylate monomers are alkyl (meth)acrylate monomers as well as various (meth)acrylate monomers containing at least one of the aforementioned reactive moieties.

In some embodiments, the impact modifier comprises a copolymer derived from ethylene, propylene, or mixtures of ethylene and propylene, as the alkylene component; butyl acrylate, hexyl acrylate, propyl acrylate, a corresponding alkyl(methyl)acrylates or a combination of the foregoing acrylates, for the alkyl(meth)acrylate monomer component, with acrylic acid, maleic anhydride, glycidyl methacrylate or a combination thereof as monomers providing an additional moieties (i.e., carboxylic acid, anhydride, epoxy). The amount of units derived from acrylic acid, maleic anhydride, glycidyl methacrylate or combination thereof can be 2 to 10 weight percent based on the total weight of the copolymer. Exemplary copolymers are commercially available under a variety of tradenames including ELVALOY, SURLYN, and FUSABOND, all of which are available from DuPont.

Other types of useful impact modifiers include block copolymers, for example, A-B diblock copolymers and A-B-A triblock copolymers having of one or two aryl alkylene blocks A, which are typically polystyrene blocks, and a rubber block, B, which is typically a block derived from isoprene, butadiene or isoprene and butadiene. The block derived from butadiene, isoprene or butadiene and isoprene can be partially or completely hydrogenated. Mixtures of these diblock and triblock copolymers can also be used as well as mixtures of non-hydrogenated copolymers, partially hydrogenated copolymers, fully hydrogenated copolymers and combinations of two or more of the foregoing.

A-B and A-B-A copolymers include, but are not limited to, polystyrene-polybutadiene, polystyrene-poly(ethylene-propylene), polystyrene-polyisoprene, poly(α-methylstyrene)-polybutadiene, polystyrene-polybutadiene-polystyrene (SBS), polystyrene-poly(ethylene-propylene)-polystyrene, polystyrene-polyisoprene-polystyrene and poly(alpha-methylstyrene)-polybutadiene-poly(alpha-methylstyrene), polystyrene-poly(ethylene-propylene-styrene)-polystyrene, and the like. Mixtures of the aforementioned block copolymers are also useful. Such A-B and A-B-A block copolymers are available commercially from a number of sources, including Phillips Petroleum under the trademark SOLPRENE, KRATON Polymers, under the trademark KRATON, Dexco under the trademark VECTOR, Asahi Kasai under the trademark TUFTEC, Total Petrochemicals under the trademarks FINAPRENE and FINACLEAR and Kuraray under the trademark SEPTON.

In some embodiments, the impact modifier comprises polystyrene-poly(ethylene-butylene)-polystyrene, polystyrene-poly(ethylene-propylene), or a combination of the foregoing impact modifiers.

The thermoplastic composition can comprise an impact modifier in an amount of 1 to 15 weight percent, based on the total weight of the composition. Within this range, the impact modifier can be present in an amount greater than or equal to 1.5 weight percent, or, more specifically, in an amount greater than or equal to 2 weight percent. Also within this range, the impact modifier can be present in an amount less than or equal to 13 weight percent, or, more specifically, less than or equal to 12 weight percent.

The composition further comprises an electrically conductive filler such as electrically conductive carbon black, carbon fibers, carbon nanotubes and combinations comprising one or more of the foregoing. Electrically conductive carbon blacks are commercially available and are sold under a variety of trade names, including but not limited to S.C.F. (Super Conductive Furnace), E.C.F. (Electric Conductive Furnace), KETJENBLACK EC (available from Akzo Co., Ltd.) or acetylene black. In some embodiments the electrically conductive carbon black has an average particle size less than or equal to 200 nanometers (nm), or, more specifically, less than or equal to 100 nm, or, even more specifically, less than or equal to 50 nm. The electrically conductive carbon blacks can also have surface areas greater than 200 square meter per gram ($m^2/g$), or, more specifically, greater than 400 $m^2/g$, or, even more specifically, greater than 900 $m^2/g$ as determined by BET analysis. The electrically conductive carbon black can have a pore volume greater than or equal to 40 cubic centimeters per hundred grams ($cm^3/100$ g), or, more specifically, greater than or equal to 100 $cm^3/100$ g, or, even more specifically, greater than or equal to 150 $cm^3/100$ g, as determined by dibutyl phthalate absorption.

Carbon nanotubes that can be used include single wall carbon nanotubes (SWNTs), multiwall carbon nanotubes (MWNTs), vapor grown carbon fibers (VGCF) and combinations comprising two or more of the foregoing.

Single wall carbon nanotubes (SWNTs) can be produced by laser-evaporation of graphite, carbon arc synthesis or a high-pressure carbon monoxide conversion process (HIPCO) process. These SWNTs generally have a single wall comprising a graphene sheet with outer diameters of 0.7 to 2.4 nanometers (nm). The SWNTs can comprise a mixture of metallic SWNTs and semi-conducting SWNTs. Metallic SWNTs are those that display electrical characteristics similar to metals, while the semi-conducting SWNTs are those that are electrically semi-conducting. In some embodiments is desirable to have the composition comprise as large a fraction of metallic SWNTs as possible. SWNTs can have aspect ratios of greater than or equal to 5, or, more specifically, greater than or equal to 100, or, even more specifically, greater than or equal to 1000. While the SWNTs are generally closed structures having hemispherical caps at each end of the respective tubes, it is envisioned that SWNTs having a single open end or both open ends can also be used. The SWNTs generally comprise a central portion, which is hollow, but can be filled with amorphous carbon.

In some embodiments the SWNTs comprise metallic nanotubes in an amount of greater than or equal to 1 wt %, or, more specifically, greater than or equal to 20 wt %, or, more specifically, greater than or equal to 30 wt %, or, even more specifically greater than or equal to 50 wt %, or, even more specifically, greater than or equal to 99.9 wt % of the total weight of the SWNTs.

In some embodiments the SWNTs comprise semi-conducting nanotubes in an amount of greater than or equal to 1 wt %, or, more specifically, greater than or equal to 20 wt %, or, more specifically, greater than or equal to 30 wt %, or, even more specifically, greater than or equal to 50 wt %, or, even more specifically, greater than or equal to 99.9 wt % of the total weight of the SWNTs.

MWNTs can be produced by processes such as laser ablation and carbon arc synthesis. MWNTs have at least two graphene layers bound around an inner hollow core. Hemispherical caps generally close both ends of the MWNTs, but it is also possible to use MWNTs having only one hemispherical cap or MWNTs which are devoid of both caps. MWNTs generally have diameters of 2 to 50 nm. Within this range, the MWNTs can have an average diameter less than or equal to 40, or, more specifically, less than or equal to 30, or, even more specifically less than or equal to 20 nm. MWNTs can have an average aspect ratio greater than or equal to 5, or, more specifically, greater than or equal to 100, or, even more specifically greater than or equal to 1000.

In some embodiments, the MWNT comprises vapor grown carbon fibers (VGCF). VGCF are generally manufactured in a chemical vapor deposition process. VGCF having "tree-ring" or "fishbone" structures can be grown from hydrocarbons in the vapor phase, in the presence of particulate metal catalysts at moderate temperatures, i.e., 800 to 1500° C. In the "tree-ring" structure a multiplicity of substantially graphitic sheets are coaxially arranged around the core. In the "fishbone" structure, the fibers are characterized by graphite layers extending from the axis of the hollow core.

VGCF having diameters of 3.5 to 2000 nanometers (nm) and aspect ratios greater than or equal to 5 can be used. VGCF can have diameters of 3.5 to 500 nm, or, more specifically 3.5 to 100 nm, or, even more specifically 3.5 to 50 nm. VGCF can have an average aspect ratios greater than or equal to 100, or, more specifically, greater than or equal to 1000.

Various types of electrically conductive carbon fibers can also be used in the composition. Carbon fibers are generally classified according to their diameter, morphology, and degree of graphitization (morphology and degree of graphitization being interrelated). These characteristics are presently determined by the method used to synthesize the carbon fiber. For example, carbon fibers having diameters down to 5 micrometers, and graphene ribbons parallel to the fiber axis (in radial, planar, or circumferential arrangements) are produced commercially by pyrolysis of organic precursors in fibrous form, including phenolics, polyacrylonitrile (PAN), or pitch.

The carbon fibers generally have a diameter of greater than or equal to 1,000 nanometers (1 micrometer) to 30 micrometers. Within this range fibers having a diameter greater than or equal to 2, or, more specifically, greater than or equal to 3, or, more specifically greater than or equal to 4 micrometers can be used. Also within this range fibers having a diameter less than or equal to 25, or, more specifically, less than or equal to 15, or, even more specifically less than or equal to 11 micrometers can be used.

The composition comprises a sufficient amount of electrically conductive filler to achieve a specific volume resistivity less than or equal to $6 \times 10^6$ ohm-cm. For example, the composition can comprise electrically conductive carbon filler in an amount of 0.1 to 8.0 weight percent, based on the total weight of the composition. Within this range, the electrically conductive carbon black can be present in an amount greater than or equal to 0.8 weight percent, or, more specifically, in an amount greater than or equal to 1.0 weight percent, or, even more specifically, in an amount greater than or equal to 1.2 weight percent. Also within this range, the electrically conductive carbon black can be present in an amount less than or equal to 4.0 weight percent, or, more specifically, less than or equal to 3.0 weight percent, or, even more specifically, less than or equal to 2.0 weight percent.

In some embodiments, the reinforcing fiber comprises glass fiber. Suitable glass fibers include glass fibers having a diameter of 2 to 16 micrometers and an average length, prior to melt mixing with the other components, of 4 to 16 millimeters.

The glass fiber can be present in an amount of 5 to 45 weight percent, based on the total weight of the composition. Within this range the amount of glass fiber can be greater than or equal to 7 weight percent, or, more specifically, greater than or equal to 10 weight percent. Also within this range, the glass fiber can be present in an amount less than or equal to 43 weight percent, or, more specifically, less than or equal to 40 weight percent, or, even more specifically, less than or equal to 35 weight percent.

In some embodiments the glass fiber in the composition, after melt blending, has an average length of 40 to 150 micrometers, or more specifically, 50 to 140 micrometers, or even more specifically, 60 to 130 micrometers. As understood by one of skill in the art the average length of the fibers in the composition will be less than that of the fibers when added to form the composition due to breakage (attrition) during processing.

The composition can optionally further comprise particulate filler. Particulate fillers differ from fibrous fillers by the ratio of their dimensions. Particulate fillers have dimensions of length, width and thickness or, in the case of spherical particulate fillers, diameter. For non-spherical particulate fillers the fillers have an average aspect ratio (average length/average width) of less than or equal to 1. Exemplary particulate fillers include glass beads, talc, mica and the like. The particulate filler can comprise combinations of different particulate fillers. In some embodiments the particulate filler comprises talc. When present the particulate filler can be present in an amount of 5 to 30 weight percent based on the total weight of the composition. Within this range the amount of particulate filler can be greater than or equal to 7 weight percent, or more specifically greater than or equal to 10 weight percent. Also within this range the amount of particulate filler can be less than or equal to 28 weight percent or more specifically, less than or equal to 25 weight percent. In some embodiments the combined amount of particulate filler and reinforcing fiber is 10 weight percent to 40 weight percent, based on the total weight of the composition.

Articles molded from compositions comprising both reinforcing fiber and particulate filler demonstrate low levels of shrinkage, for example the shrinkage (in either flow direction) can be 0% to 1.0%. Within this range the shrinkage can be less than or equal to 0.9%, or, more specifically, less than or equal to 0.8%. Shrinkage is determined by injection molding a part having the dimensions of 61 mm×61 mm×1.6 mm using a mold having a 61 mm long gate. These parts are then allowed to equilibrate at 23° C. and 50% relative humidity for 24 hours. The parts are then measured in the following way. To determine in-flow shrinkage, the length of the part is measured as the polymer would fill the mold. Three measurements are taken at equal distances across the part, and an average value is reported. Shrinkage is determined by comparing the difference in the measured part to the dimensions of the mold. For example, if the average value was 60 mm, then the shrinkage would be:

$$((61 \text{ mm} - 60 \text{ mm})/61 \text{ mm}) \cdot 100 = 1.6\%.$$

To determine the cross flow shrinkage the same method would apply except the part is measured perpendicular to the flow direction at equal intervals. The average value is determined and compared against the dimension of the tool as described for the in-flow shrinkage.

The composition may also include effective amounts of at least one additive selected from the group consisting of antioxidants, flame retardants, drip retardants, dyes, pigments, colorants, stabilizers, antistatic agents, plasticizers, lubricants, and combinations comprising one or more of the foregoing. These additives are known in the art, as are their effective levels and methods of incorporation. Effective amounts of the additives vary widely, but they are usually present in an amount up to 50% or more by weight based on the weight of the entire composition. In some embodiments the additives are present in an amount of 0.1 to 10 weight percent, or, more specifically, 0.2 to 2 weight percent, based on the total weight of the composition.

In some embodiments the thermoplastic composition consists essentially of:

a compatibilized poly(arylene ether)/polyamide-6 blend, electrically conductive filler, 10 to 40 weight percent, based on the total weight of the composition, of glass fiber, and an optional impact modifier. As used herein with reference to the composition the term "consists essentially of" permits the inclusion of conventional additives and can contain trace amounts of contaminants and side products. The composition described in this paragraph is substantially free of polyamides other than polyamide-6. "Substantially free" as used herein with reference to the composition is defined as containing less than 5 weight percent, or, more specifically, less than 3 weight percent, or, even more specifically, less than 1 weight percent, based on the total weight of the composition, of any polyamide other than polyamide-6. Additionally, the weight ratio of poly(arylene ether) to polyamide is 0.25 to 0.40.

In some embodiments the thermoplastic composition consists essentially of:

a compatibilized poly(arylene ether)/polyamide-6 blend, electrically conductive filler, 10 to 30 weight percent, based on the total weight of the composition, of glass fiber, and an optional impact modifier. As used herein with reference to the composition the term "consists essentially of" permits the inclusion of conventional additives and can contain trace amounts of contaminants and side products. The composition described in this paragraph is substantially free of polyamides other than polyamide-6. "Substantially free" as used herein with reference to the composition is defined as containing less than 5 weight percent, or, more specifically, less than 3 weight percent, or, even more specifically, less than 1 weight percent, based on the total weight of the composition, of any polyamide other than polyamide-6. Additionally, the weight ratio of the combined weight of poly(arylene ether) and glass fiber to the weight of polyamide is 0.5 to 0.9.

The composition is prepared by melt blending or a combination of dry blending and melt blending. Melt blending can be performed in single or twin screw type extruders or similar mixing devices which can apply a shear to the components.

All of the ingredients can be added initially to the processing system. Alternatively, in some embodiments, the poly(arylene ether) can be melt blended with the compatibilizing agent to form a first mixture and optionally pelletized. Additionally other ingredients such as an impact modifier, additives, or a combination comprising one of the foregoing can be melt blended with the compatibilizing agent and poly(arylene ether) to form a first mixture and optionally pelletized. The first mixture is melt blended with the polyamide and any remaining components.

When using an extruder, all or part of the polyamide can be fed through a port downstream. While separate extruders can be used in the processing, preparations in a single extruder having multiple feed ports along its length to accommodate the addition of the various components simplifies the process. It is often advantageous to apply a vacuum to the melt through one or more vent ports in the extruder to remove volatile impurities in the composition.

The electrically conductive filler can be added by itself, with other ingredients (optionally as a dry blend) or as part of a masterbatch. In some embodiments, the electrically conductive filler is part of a masterbatch comprising polyamide. The electrically conductive carbon black (independently or as a masterbatch) can be added with the poly(arylene ether), with the polyamide (the second portion when two portions are employed), or after the addition of the polyamide (the second portion when two portions are employed).

The reinforcing fiber can be added by itself, with other ingredients (optionally as a dry blend) or as part of a masterbatch. In some embodiments all or part of the reinforcing fiber is part of a masterbatch comprising polyamide and optionally an impact modifier. The reinforcing fiber (independently or as a masterbatch) can be added with the poly(arylene ether), with the polyamide (the second portion when two portions are employed), or after the addition of the polyamide (the second portion when two portions are employed).

As used herein the term "masterbatch" describes a melt blend of one or more thermoplastics and one or more additives wherein the additive, such as electrically conductive carbon black, is present in the masterbatch in a higher concentration than it is found in the final thermoplastic composition. For example, a masterbatch can comprise one or more additives and polyamide, one or more impact modifiers, or a combination of polyamide and one or more impact modifiers.

In some embodiments the composition comprises a reaction product of poly(arylene ether); polyamide-6; optional additional polyamide; electrically conductive filler; compatibilizing agent; reinforcing fiber and optional impact modifiers. As used herein a reaction product is defined as a product resulting from the reaction of two or more of the foregoing components under the conditions employed to form the composition or during further processing of the components, for example during melt mixing or molding.

In some embodiments melt mixing is performed using an extruder and the composition exits the extruder in a strand or multiple strands. The shape of the strand is dependent upon the shape of the die used and has no particular limitation. The strand diameter and the pellet length are typically chosen to prevent or reduce the production of fines (particles that have a volume less than or equal to 50% of the pellet) and for maximum efficiency in subsequent processing such as profile extrusion. An exemplary pellet length is 1 to 5 millimeters and an exemplary pellet diameter is 1 to 5 millimeters.

The pellets can exhibit hygroscopic properties. Once water is absorbed it can be difficult to remove. It is advantageous to protect the composition from ambient moisture. In some embodiments the pellets, once cooled to a temperature of 50° C. to 110° C., are packaged in a container comprising a mono-layer of polypropylene resin free of a metal layer wherein the container has a wall thickness of 0.25 millimeters to 0.60 millimeters. The pellets, once cooled to 50 to 110° C. can also be packaged in foiled lined containers such as foil lined boxes and foil lined bags or other types of containers having a moisture barrier.

The thermoplastic composition can be injection molded to form an article such as an engine cover, appliance handle, vehicular mirror bracket, wind foil bracket, or fender extension. These types of articles require tensile strength, tensile modulus, impact strength, good aesthetic properties when painted or a combination of one or more of the foregoing. The injection molded articles show little or no visible fibers on the molded article surface.

These articles can be painted using either a solvent based electrostatic system or a powder based electrostatic system. In electrostatic solvent based painting, charged atomized particles of liquid are attracted to a grounded thermoplastic section. The liquid particles comprise a solvent or carrier which is evaporated after the application to the thermoplastic section thus forming a film. Electrostatic painting can involve the application of a primer, a base coat, a clear coat or any combination of the foregoing. In some embodiments the article is coated with a primer and a clear coat. In some embodiments the article is coated with a base coat and a clear coat.

When describing the final finish achieved by electrostatic painting using liquid particles the resulting film is referred to herein as a paint film and includes the film resulting from a primer, base coat, clear coat or any combination of the foregoing. Articles made from the thermoplastic composition described herein have paint film thicknesses produced by electrostatic painting with liquid particles of 38 micrometers (1.5 mils) to 152 micrometers (6 mils). Within this range the paint film thickness can be greater than or equal to 51 micrometers (2 mils). Also within this range the paint film thickness can be less than or equal to 127 micrometers (5 mils).

In electrostatic powder coating charged solid particles are attracted to a grounded thermoplastic section. The thermoplastic section and powder are then heated to a temperature sufficient for the powder to melt and form a paint film.

Typical paint film thicknesses produced by powder coating are 38 to 178 micrometers. Within this range, the paint film thickness can be greater than or equal to 51 micrometers, or, more specifically, greater than or equal to 76 micrometers. Also within this range the paint film thickness can be less than or equal to 152 micrometers, or, more specifically, less than or equal to 127 micrometers.

Paint film thickness can be determined by optical microscopy or scanning electron microscopy of a section taken perpendicular to the plane of the coated surface. For example, sections can be taken with a diamond knife from a cross sectioned piece of the article having a paint film. The sections can be viewed with a compound light microscope, such as an Olympus BX60, using reflected light. A digital camera, such as an Optronics microfire, mounted to the light microscope can be used to capture the digital optical micrographs of the film layer/thermoplastic sections. Analysis software, such as Image-pro plus version 4.5, can be used to measure the paint film thickness from the captured digital optical micrographs. Alternatively, samples can be taken from a cross section and trimmed and block-faced using a scalpel. The samples can then be microtomed perpendicular to the coated surface using a glass knife followed by further microtoming with a diamond knife. Analysis is performed on the samples, not the sections removed by microtoming. The samples are mounted on SEM sample stubs and coated with gold for 50 seconds under a plasma current of 13 milliangstroms. The samples can then be viewed by scanning electron microscopy (SEM) under vacuum at a magnification of 200× in the back-scattered electron (BSE) mode. Image analysis can be performed using Clemex Vision PE 4.0 software. In either method the reported thickness is the average of greater than or equal to 10 measurements, or, more specifically, greater than or equal to 30 measurements, or, even more specifically, greater than or equal to 50 measurements of thickness across the image.

The articles described herein and made from the thermoplastic composition described herein have an excellent surface appearance with less application of powder coating or primer, base coat, clear coat or any combination thereof. In the past, articles comprising reinforcing fiber would require coating thicknesses of greater than or equal to 203 micrometers (8 mils) to achieve a surface with a glossy, smooth appearance.

One method of evaluating the surface finish of a painted article is distinctness of image (DOI). DOI is determined based upon the reflectance of light from a painted surface. DOI is evaluated on a scale of 1 to 100. Values closer to 100 indicated a smoother and glossier surface. The articles comprising a paint film disclosed herein have a DOI greater than or equal to 85, or, more specifically, greater than or equal to 88, or, more specifically, greater than or equal to 90. DOI is determined as described in the Examples.

In some embodiments an article comprises a paint film disposed on at least a portion of a thermoplastic section. The thermoplastic section is made from a thermoplastic composition comprising:

a compatibilized blend of poly(arylene ether) and polyamide;

10 to 40 weight percent, based on the total weight of the composition, of a reinforcing fiber; and an electrically conductive filler, wherein the compatibilized blend has a weight ratio of poly(arylene ether) to polyamide of 0.25 to 0.40;

wherein greater than 50 weight percent of the polyamide, based on the total weight of the polyamide, is polyamide-6. The paint film has a thickness of 38 micrometers to 178 micrometers. The article with the paint film has a DOI greater than or equal to 85. The article can be an engine housing or covering, or, more specifically, an engine cover for an outboard boat motor. In some embodiments the paint film is produced by electrostatic painting using liquid particles. In some embodiments the paint film is produced by powder coating.

In some embodiments an article comprises a paint film disposed on at least a portion of a thermoplastic section. The thermoplastic section is made from a thermoplastic composition comprising:

a compatibilized blend of poly(arylene ether) and polyamide;

10 to 30 weight percent, based on the total weight of the composition, of reinforcing fiber; and an electrically conductive filler;

wherein the weight ratio of the combined weight of poly (arylene ether) and reinforcing fiber to the weight of the polyamide is 0.5 to 0.9, and wherein greater than 50 weight percent of the polyamide is polyamide-6. The paint film has a thickness of 38 micrometers to 178 micrometers. The article, with the paint film, has a distinctness of image (DOI) of greater than or equal to 85. In some embodiments the paint film is produced by electrostatic painting using liquid particles. In some embodiments the paint film is produced by powder coating.

The following non-limiting examples further illustrate the various embodiments described herein.

EXAMPLES

The examples were produced using the materials listed in Table 1 unless otherwise specified.

TABLE 1

| Material | Description |
| --- | --- |
| PPE | Poly(2,6-dimethylphenylene ether) was obtained from GE Plastics and had a weight average molecular weight (Mw) of 62,000 and an intrinsic viscosity of 0.46 deciliters per gram (dl/g) measured in chloroform at 23° C. |
| SEBS | Polystyrene-poly(ethylene-butylene)-polystyrene commercially available from KRATON Polymers under the tradename KRATON G1651E |
| CA | Anhydrous citric acid available from SD Fine Chem Ltd. |
| GF | Glass fiber commercially available from Owens Corning under the tradename Advantex 173X-10N. |
| Polyamide-6,6 | Nylon-6,6 having weight average molecular weight (Mw) of 62,500 and available from Rhodia under the grade name of 24SE. |
| Polyamide-6 | Nylon-6 having a weight average molecular weight of 73,100 and available as RD963 from Custom Resins. |
| CCB | Conductive carbon black commercially available under the tradename KETJENBLACK EC 600JD from Akzo Nobel |
| Polyamide-6/CCB masterbatch | A blend of 90 wt % of polyamide-6 and 10 wt % of CCB, based on the total weight of the masterbatch |
| MWNT | Multiwall carbon nanotubes commercially available from Hyperion Catalysis. |
| Polyamide-6,6/MWNT masterbatch | A blend of 80 wt % of polyamide-6,6 and 20 wt % of MWNT, based on the total weight of the masterbatch |
| Polyamide 6,6/CCB masterbatch | A blend of 92 wt % of polyamide-6,6 and 8.0 wt % of CCB, based on the total weight of the masterbatch |

Examples were tested for specific volume resistivity (SVR). The compositions were injection molded into ISO tensile bars. The bars were scored at a location 25 millimeters from the center of the bar on each side and then submerged in liquid nitrogen for approximately 5 minutes. As soon as the bars were removed from the liquid nitrogen they were snapped at the score marks for a brittle break. The ends were painted with electrically conductive silver paint and dried. Resistance was measured by placing the probes of a handheld multimeter on each painted end of the bar. The multimeter used was a Mastech M92A multimeter. The resistivity was calculated as the resistance (in Ohms)×bar width (in centimeters (cm))×bar depth (cm) divided by the bar length (cm). Results are reported in kiloOhms-centimeter or in Ohms-centimeter.

Samples were tested for other physical properties using the methods described above and summarized in Table 2.

a 30 mm twin screw Werner and Pfleiderer extruder. The barrel temperature was 290° C., the throughput was 18 kilograms per hour and the rotations per minutes (RPM) was 300. The compositions were injection molded to form the appropriate parts for testing using an 85 ton Van Dorn injection molding machine. The melt temperature was 290° C. and the mold temperature was 90° C. The compositions were also molded into 102 mm×305 mm×3.2 mm plaques on a Toshiba ISE310 Injection molding machine, using the same melt and mold temperatures. These plaques were powder coated using a Nordson spray booth at 24° C. and 50% relative humidity and polyester epoxy hybrid powder coating from IVC Industrial Coatings. Dry off temperatures were 185-199° C. for 20 minutes and cure temperatures were 185-199° C. for 20 minutes. The painted plaques were visually evaluated for visibility of glass fiber on the painted surface.

TABLE 3

|  | Ex. 1* | Ex. 2* | Ex. 3 | Ex. 4* | Ex. 5* | Ex. 6* |
| --- | --- | --- | --- | --- | --- | --- |
| PPE | 25.0 | 20.0 | 15.0 | 25.0 | 20.0 | 15.0 |
| CA | 0.6 | 0.6 | 0.6 | 0.6 | 0.6 | 0.6 |
| Additives | 0.6 | 0.6 | 0.6 | 0.6 | 0.6 | 0.6 |
| Polyamide-6 | 26.0 | 31.0 | 36.0 | — | — | — |
| Polyamide-6/CCB masterbatch | 18.0 | 18.0 | 18.0 | — | — | — |
| Polyamide-6,6 | — | — | — | 22.0 | 27.0 | 32.0 |
| Polyamide-6,6/CCB masterbatch | — | — | — | 22.5 | 22.5 | 22.5 |
| GF | 30.0 | 30.0 | 30.0 | 30.0 | 30.0 | 30.0 |
| PPE/polyamide weight ratio | 0.59 | 0.42 | 0.29 | 0.59 | 0.42 | 0.28 |
| (PPE + GF)/polyamide weight ratio | 1.3 | 1.0 | 0.9 | 1.3 | 1.0 | 0.8 |

*Comparative example

TABLE 2

| Test Method | Material Property | Units of data | Machine/Instrument |
| --- | --- | --- | --- |
| ISO 527 | Nominal tensile strain at break | % | Instron 5566 |
| ISO 527 | Tensile strength | MPa | Instron 5566 |
| ISO 527 | Tensile modulus | MPa | Instron 5566 |
| ISO 180/1A | Notched Izod impact strength | kilojoules per square meter (kJ/m$^2$) | CEAST Izod Tester |
| ISO 306 | Vicat softening temperature (VST) (B/120) | ° C. | CEAST VST |

Examples 1-6

Examples were made by melt blending PPE, CA, GF, CCB, a conventional additive package, and polyamide-6 or polyamide-6,6. The compositions are shown in Table 3 with amounts in weight percent based on the total weight of the composition. The PPE, polyamide, CA, additives, and polyamide-6/CCB masterbatch or polyamide-6,6/CCB masterbatch were added at the feed throat of the extruder. The glass fiber was added downstream. Melt blending was performed in Examples 4, 5 and 6, which all use polyamide-6,6, show poor surface appearance after powder coating regardless of the PPE/polyamide weight ratio. In particular, glass fibers are seen through the painted surface. Similarly, Examples 1 and 2, which use polyamide-6 but have a PPE/polyamide weight ratio greater than 0.40 and a (PPE+GF)/polyamide weight ratio greater than or equal to 1.0, show poor surface appearance after powder coating and glass fibers can also be seen through the painted surface. In contrast, Example 3, which uses polyamide-6 and has a PPE/polyamide weight ratio of 0.29 and a (PPE+GF)/polyamide weight ratio of 0.9 has an excellent surface appearance after powder coating.

Examples 7-10

Examples 7-10 were made in the same manner as Examples 1-6. Compositions and data are shown in Table 4.

TABLE 4

|  | 7 | 8 | 9 | 10 |
| --- | --- | --- | --- | --- |
| PPE | 25 | 20 | 15 | 15 |
| CA | 0.6 | 0.6 | 0.6 | 0.6 |
| Additives | 0.6 | 0.6 | 0.6 | 0.6 |
| Polyamide-6 | 46 | 41 | 36 | 26 |

TABLE 4-continued

|  | 7 | 8 | 9 | 10 |
|---|---|---|---|---|
| Polyamide-6/CCB masterbatch | 18 | 18 | 18 | 18 |
| GF | 10 | 20 | 30 | 40 |
| PPE/polyamide weight ratio | 0.40 | 0.35 | 0.29 | 0.36 |
| (PPE + GF)/polyamide weight ratio | 0.6 | 0.7 | 0.9 | 1.3 |
| Tensile Modulus (MPa) | 4400 | 6900 | 9000 | 14,100 |
| Tensile Strength (MPa) | 100 | 128 | 180 | 215 |
| Nominal tensile strain at break (%) | 7 | 3.2 | 3 | 2.8 |
| Notched Izod (kJ/m$^2$) | 8 | 9 | 10 | 11 | ing glass fiber compared to compositions not containing glass fiber. The compositions were made and molded in the same manner as the preceding examples and the SEBS was added with the poly(arylene ether). The amount of CCB is shown both on a weight percent based on the total weight of the composition (CCB loading) and on a weight percent based on the total weight of the composition minus the weight of the glass fiber (normalized CCB loading). The compositions and physical properties are shown in Table 5. The SVR data is presented in Ohm-centimeters.

TABLE 5

|  | 11 | 12 | 13 | 14 | 15 | 16 | 17* | 18* | 19* | 20* | 21* | 22* |
|---|---|---|---|---|---|---|---|---|---|---|---|---|
| PPE | 30 | 30 | 30 | 30 | 30 | 30 | 25.3 | 25.3 | 25.3 | 25.3 | 25.3 | 25.3 |
| CA | 0.6 | 0.6 | 0.6 | 0.6 | 0.6 | 0.6 | 0.75 | 0.75 | 0.75 | 0.75 | 0.75 | 0.75 |
| Additives | 0.6 | 0.6 | 0.6 | 0.6 | 0.6 | 0.6 | 0.8 | 0.8 | 0.8 | 0.8 | 0.8 | 0.8 |
| SEBS | 6 | 6 | 6 | 6 | 6 | 6 | 7.5 | 7.5 | 7.5 | 7.5 | 7.5 | 7.5 |
| Polyamide-6 | 37.75 | 35.75 | 33.75 | 31.75 | 29.75 | 27.75 | 50.9375 | 48.75 | 46.75 | 44.75 | 42.75 | 40.75 |
| Polyamide-6/CCB masterbatch | 15 | 17 | 19 | 21 | 23 | 25 | 15 | 17 | 19 | 21 | 23 | 25 |
| GF | 10 | 10 | 10 | 10 | 10 | 10 | — | — | — | — | — | — |
| CCB loading | 1.5 | 1.7 | 1.9 | 2.1 | 2.3 | 2.5 | 1.5 | 1.7 | 1.9 | 2.1 | 2.3 | 2.5 |
| Normalized CCB loading | 1.7 | 1.9 | 2.1 | 2.3 | 2.5 | 2.8 | — | — | — | — | — | — |
| PPE/polyamide weight ratio | 0.59 | 0.59 | 0.59 | 0.59 | 0.59 | 0.60 | 0.39 | 0.40 | 0.40 | 0.40 | 0.40 | 0.40 |
| (PPE + GF)/polyamide weight ratio | 0.8 | 0.8 | 0.8 | 0.8 | 0.8 | 0.8 | — | — | — | — | — | — |
| SVR (Ohm-cm) | 102440 | 21010 | 8920 | 2230 | 965 | 413 | OL | 985953 | 155213 | 26871 | 8126 | 3264 |
| Notched Izod (kJ/m$^2$) | 10.2 | 10.4 | 10.5 | 9.9 | 9.4 | 9.7 | 11 | 12 | 11 | 13 | 12 | 11 |
| Tensile Modulus (MPa) | 4506 | 4723 | 4689 | 4894 | 4635 | 4590 | 2704 | 2795 | 2803 | 2818 | 2771 | 2847 |
| Nominal tensile strain at break (%) | 4 | 4 | 4 | 4 | 4 | 4 | 36 | 35 | 40 | 32 | 33 | 30 |
| Tensile Strength (MPa) | 101 | 98 | 99 | 102 | 103 | 99 | 56 | 55 | 56 | 56 | 55 | 56 |

OL = out of limit of detection
*Comparative example

TABLE 4-continued

|  | 7 | 8 | 9 | 10 |
|---|---|---|---|---|
| SVR (kOhm-cm) | 2200 | 3145 | 4123 | 1890 |
| VST (° C.) | 198 | 210 | 210 | 220 |

The tensile modulus increases with increasing amounts of glass fiber in the composition. Additionally, plaques of each of Examples 7-10, when painted as described above with regard to Example 1-6, do not show any glass fibers through the paint. Examples 7-10 all had a PPE to polyamide weight ratio of 0.40 or less. Examples 7-9 had a weight ratio of the combined weight of PPE and GF to polyamide of less than 1.0.

Examples 11-22

Examples 11-22 were made to demonstrate the difference in volume resistivity (conductivity) of compositions contain- Comparisons of Examples 11 through 15 to Examples 18 through 22 show that compositions containing glass fiber (reinforced compositions) have a volume resistivity that is at least 50% less than the comparable compositions that do not contain glass fiber (non-reinforced compositions). For instance, when Example 11 is compared to Example 18 (both containing comparable amounts of CCB based on the total resin content) the reinforced composition (Ex. 11) has a volume resistivity more than ten times less than the volume resistivity of the non-reinforced composition (Ex. 18). This is unexpected as one would expect that comparable amounts, based on non-glass content, of electrically conductive filler would result in comparable resistivity in the presence or absence of glass fiber.

Examples 23-34

Compositions similar to Examples 11-22 but containing MWNT as the electrically conductive filler were made. The compositions shown in Table 6 were made and tested as described for the Examples 11-22. Data is shown in Table 6.

TABLE 6

|  | 23 | 24 | 25 | 26 | 27 | 28 | 29* |
|---|---|---|---|---|---|---|---|
| PPE | 30 | 30 | 30 | 30 | 30 | 30 | 25.3 |
| CA | 0.6 | 0.6 | 0.6 | 0.6 | 0.6 | 0.6 | 0.75 |
| Additives | 0.6 | 0.6 | 0.6 | 0.6 | 0.6 | 0.6 | 0.8 |
| SEBS | 6 | 6 | 6 | 6 | 6 | 6 | 7.5 |
| Polyamide-6 | 47.75 | 46.75 | 45.75 | 44.75 | 43.75 | 42.75 | 61 |
| Polyamide-6,6/MWNT masterbatch | 5 | 6 | 7 | 8 | 9 | 10 | 5 |
| GF | 10 | 10 | 10 | 10 | 10 | 10 | — |
| PPE/polyamide weight ratio | 0.58 | 0.58 | 0.58 | 0.59 | 0.59 | 0.59 | 0.39 |
| (PPE + GF)/polyamide weight ratio | 0.8 | 0.8 | 0.8 | 0.8 | 0.8 | 0.8 | 0.4 |
| MWNT loading | 1.0 | 1.2 | 1.4 | 1.6 | 1.8 | 2.0 | 1.0 |
| Normalized MWNT loading | 1.1 | 1.3 | 1.5 | 1.8 | 2 | 2.2 | — |
| SVR (Ohm-cm) | 408,200 | 145,609 | 45,678 | 11,200 | 6,789 | 1,240 | 24,944,881 |
| Notched Izod(kJ/m$^2$) | 11 | 11 | 11 | 10 | 11 | 10 | 14 |
| Tensile Modulus (MPa) | 4890 | 4900 | 4756 | 4871 | 4690 | 4823 | 2745 |
| Nominal tensile strain at break (%) | 5 | 5 | 4 | 5 | 4 | 5 | 39 |
| Tensile Strength (MPa) | 103 | 100 | 102 | 100 | 103 | 101 | 61 |

|  | 30* | 31* | 32* | 33* | 34* |
|---|---|---|---|---|---|
| PPE | 25.3 | 25.3 | 25.3 | 25.3 | 25.3 |
| CA | 0.75 | 0.75 | 0.75 | 0.75 | 0.75 |
| Additives | 0.8 | 0.8 | 0.8 | 0.8 | 0.8 |
| SEBS | 7.5 | 7.5 | 7.5 | 7.5 | 7.5 |
| Polyamide-6 | 60 | 59 | 58 | 57 | 56 |
| Polyamide-6,6/MWNT masterbatch | 6 | 7 | 8 | 9 | 10 |
| GF | — | — | — | — | — |
| PPE/polyamide weight ratio | 0.39 | 0.39 | 0.39 | 0.39 | 0.40 |
| (PPE + GF)/polyamide weight ratio | 0.4 | 0.4 | 0.4 | 0.4 | 0.4 |
| MWNT loading | 1.2 | 1.4 | 1.6 | 1.8 | 2.0 |
| Normalized MWNT loading | — | — | — | — | — |
| SVR (Ohm-cm) | 8,604,724 | 1,702,047 | 148,031 | 24,957 | 7,637 |
| Notched Izod(kJ/m$^2$) | 13 | 15 | 16 | 15 | 13 |
| Tensile Modulus (MPa) | 2707 | 2681 | 2698 | 2691 | 2703 |
| Nominal tensile strain at break (%) | 40 | 41 | 40 | 36 | 37 |
| Tensile Strength (MPa) | 62 | 63 | 63 | 62 | 61 |

*Comparative Example

A comparison of Examples 23-28 to Examples 29-34 shows that the inclusion of 10 weight percent glass fiber decreases the volume resistivity of a composition by 50 percent or more when the MWNT loading is less than or equal to 1.6 weight percent based on the total weight of the composition. At loadings higher than 1.6 weight percent a decrease in volume resistivity is seen, although a less dramatic one.

Examples 35-46

Examples 35-46 further demonstrate the difference in volume resistivity (conductivity) of compositions containing glass fiber compared to compositions not containing glass fiber. The compositions contained 20 weight percent or 30 weight percent glass fiber based on the total weight of the composition. In contrast Examples 11-16 contained 10 weight percent glass fiber based on the total weight of the composition.

The compositions were made and molded in the same manner as preceding examples. The amount of CCB is shown both on a weight percent based on the total weight of the composition (CCB loading) and on a weight percent based on the total weight of the composition minus the weight of the glass fiber (normalized CCB loading). The compositions and physical properties are shown in Table 7. The SVR data is presented in Ohm-centimeters.

TABLE 7

|  | 35 | 36 | 37 | 38 | 39 | 40 | 41 | 42 | 43 | 44 | 45 | 46 |
|---|---|---|---|---|---|---|---|---|---|---|---|---|
| PPE | 20 | 20 | 20 | 20 | 20 | 20 | 15 | 15 | 15 | 15 | 15 | 15 |
| CA | 0.6 | 0.6 | 0.6 | 0.6 | 0.6 | 0.6 | 0.6 | 0.6 | 0.6 | 0.6 | 0.6 | 0.6 |
| Additives | 0.6 | 0.6 | 0.6 | 0.6 | 0.6 | 0.6 | 0.6 | 0.6 | 0.6 | 0.6 | 0.6 | 0.6 |
| SEBS | 6 | 6 | 6 | 6 | 6 | 6 | — | — | — | — | — | — |
| Polyamide-6 | 37.75 | 35.75 | 33.75 | 31.75 | 29.75 | 27.75 | 38.75 | 36.75 | 34.75 | 32.75 | 30.75 | 27.75 |
| Polyamide-6/CCB masterbatch | 15 | 17 | 19 | 21 | 23 | 25 | 15 | 17 | 19 | 21 | 23 | 25 |
| GF | 20 | 20 | 20 | 20 | 20 | 20 | 30 | 30 | 30 | 30 | 30 | 30 |
| CCB loading | 1.5 | 1.7 | 1.9 | 2.1 | 2.3 | 2.5 | 1.5 | 1.7 | 1.9 | 2.1 | 2.3 | 2.5 |
| Normalized CCB loading | 1.9 | 2.1 | 2.4 | 2.6 | 2.9 | 3.1 | 2.1 | 2.4 | 2.7 | 3 | 3.3 | 3.6 |
| PPE/polyamide weight ratio | 0.39 | 0.39 | 0.39 | 0.39 | 0.40 | 0.40 | 0.29 | 0.29 | 0.29 | 0.29 | 0.29 | 0.30 |
| (PPE + GF)/polyamide weight ratio | 0.8 | 0.8 | 0.8 | 0.8 | 0.8 | 0.8 | 0.9 | 0.9 | 0.9 | 0.9 | 0.9 | 0.9 |
| SVR (Ohm-cm) | 11880 | 2557 | 1650 | 756 | 453 | 315 | 8790 | 2010 | 1345 | 645 | 312 | 101 |
| Notched Izod (kJ/m$^2$) | 10 | 9 | 9 | 9 | 9 | 8 | 10 | 11 | 10 | 10 | 11 | 10 |
| Tensile Modulus (MPa) | 7460 | 7307 | 6858 | 6894 | 6957 | 6936 | 9189 | 9234 | 9102 | 9309 | 9287 | 9307 |
| Nominal tensile strain at break (%) | 3 | 3 | 3 | 3 | 3 | 3 | 2 | 2 | 2 | 2 | 2 | 2 |
| Tensile Strength (MPa) | 143 | 139 | 133 | 133 | 134 | 136 | 183 | 181 | 179 | 182 | 178 | 184 |

Examples 36 and 41 demonstrate, when compared to Example 20, that even at high loadings of glass fiber the reinforced compositions still have a volume resistivity that is less than half of the volume resistivity of a non-reinforced composition at the same loading of CCB based on the non-glass content. Examples 37 and 42, when compared to Example 21, show the same effect.

Examples 47-58

Examples 47-58 further demonstrate the difference in volume resistivity (conductivity) of compositions containing glass fiber compared to compositions not containing glass fiber. The compositions contained 20 weight percent or 30 weight percent glass fiber based on the total weight of the composition. In contrast Examples 11-16 contained 10 weight percent glass fiber based on the total weight of the composition.

The compositions were made and molded in the same manner as the preceding examples. The amount of MWNT is shown both on a weight percent based on the total weight of the composition (MWNT loading) and on a weight percent based on the total weight of the composition minus the weight of the glass fiber (normalized MWNT loading). The compositions and physical properties are shown in Table 8. The SVR data is presented in Ohm-centimeters.

TABLE 8

|  | 47 | 48 | 49 | 50 | 51 | 52 | 53 | 54 | 55 | 56 | 57 | 58 |
|---|---|---|---|---|---|---|---|---|---|---|---|---|
| PPE | 20 | 20 | 20 | 20 | 20 | 20 | 15 | 15 | 15 | 15 | 15 | 15 |
| CA | 0.6 | 0.6 | 0.6 | 0.6 | 0.6 | 0.6 | 0.6 | 0.6 | 0.6 | 0.6 | 0.6 | 0.6 |
| Additives | 0.6 | 0.6 | 0.6 | 0.6 | 0.6 | 0.6 | 0.6 | 0.6 | 0.6 | 0.6 | 0.6 | 0.6 |
| SEBS | 6 | 6 | 6 | 6 | 6 | 6 | — | — | — | — | — | — |
| Polyamide-6 | 47.75 | 46.75 | 45.75 | 44.75 | 43.75 | 42.75 | 48.75 | 47.75 | 46.75 | 45.75 | 44.75 | 43.75 |
| Polyamide-6,6/MWNT masterbatch | 5 | 6 | 7 | 8 | 9 | 10 | 5 | 6 | 7 | 8 | 9 | 10 |
| GF | 20 | 20 | 20 | 20 | 20 | 20 | 30 | 30 | 30 | 30 | 30 | 30 |
| MWNT loading | 1.0 | 1.2 | 1.4 | 1.6 | 1.8 | 2.0 | 1.0 | 1.2 | 1.4 | 1.6 | 1.8 | 2.0 |
| Normalized MWNT loading | 1.2 | 1.5 | 1.8 | 2.0 | 2.3 | 2.5 | 1.4 | 1.7 | 2.0 | 2.3 | 2.6 | 2.8 |
| PPE/polyamide weight ratio | 0.39 | 0.39 | 0.39 | 0.39 | 0.39 | 0.39 | 0.28 | 0.29 | 0.29 | 0.29 | 0.29 | 0.29 |
| (PPE + GF)/polyamide weight ratio | 0.8 | 0.8 | 0.8 | 0.8 | 0.8 | 0.8 | 0.9 | 0.9 | 0.9 | 0.9 | 0.9 | 0.9 |
| SVR (Ohm-cm) | 203666 | 97008 | 14803 | 4800 | 2519 | 1021 | 75690 | 23401 | 6821 | 2304 | 567 | 145 |
| Notched Izod (kJ/m$^2$) | 8 | 8 | 9 | 8 | 8 | 8 | 11 | 11 | 11 | 10 | 11 | 10 |
| Tensile Modulus (MPa) | 6568 | 6714 | 7259 | 6737 | 6730 | 6765 | 92334 | 9102 | 9309 | 9254 | 9301 | 9190 |
| Nominal tensile strain at break (%) | 3 | 3 | 3 | 3 | 3 | 3 | 2 | 2 | 3 | 2 | 2 | 3 |
| Tensile Strength (MPa) | 124 | 122 | 131 | 123 | 119 | 122 | 178 | 180 | 178 | 182 | 184 | 181 |

Examples 48 and 53 demonstrate, when compared to Example 31, that even at high loadings of glass fiber the reinforced compositions having a normalized MWNT loading less than or equal to 1.6 wt % still have a volume resistivity that is significantly less than non-reinforced compositions having a MWNT loading of 1.6 wt %.

Examples 59-60

Examples 59 and 60 were made, molded and tested in the same manner as the preceding examples. The talc/polyamide-6 masterbatch was added with the glass fiber. The composition and data are shown in Table 9. Shrinkage was determined as described above.

TABLE 9

|  | 59 | 60 |
|---|---|---|
| PPE | 16.5 | 16.5 |
| CA | 0.6 | 0.6 |
| Additives | 0.6 | 0.6 |
| Polyamide-6 | 22.25 | 34.25 |
| Polyamide-6/CCB masterbatch | 18 | 18 |
| GF | 20 | 30 |
| Talc/polyamide-6 masterbatch | 22 | — |
| PPE/polyamide weight ratio | 0.34 | 0.33 |
| (PPE + GF)/polyamide weight ratio | 0.8 | 0.9 |
| Notched Izod (KJ/m2) | 8.0 | 11.1 |
| SVR (kOhm-cm) | 3.4 | 8.4 |
| Tensile Modulus (Mpa) | 9,600 | 11,200 |
| Tensile Strength (Mpa) | 150 | 195 |
| Nominal tensile strain at break (%) | 2.8 | 3.2 |
| Shrinkage (%) In-flow direction | 0.27 | 0.21 |
| Shrinkage (%) Cross Flow Direction | 0.60 | 0.70 |

Example 59, which contains talc as a portion of the total filler shows less shrinkage in the cross flow direction than Example 60 which contains only glass and does not contain talc. Less shrinkage is indicative of better overall dimensional stability.

Distinctness of image (DOI) was determined using 102 mm×305 mm×3.2 mm flat plaques made on a Toshiba ISE310 Injection molding machine, using the same melt and mold temperatures as described in Examples 1-6. The plaques were electrostatically coated using liquid particles (solvent coated) with a conductive black base primer (Rohm and Haas UNI-COAT™ UR560CAFH) followed by a 10 minute flash and a 15 minute bake at 149° C. (300° F.). A clear coat (PPG Industries DELTRON™ DC3000) was then applied and allowed to dry in ambient conditions for 72 hours before testing for DOI. The thickness of the paint film was 46 to 66 micrometers. DOI was tested using a Micro-wave-scan available from BYK Gardner. The DOI value is the average of three plaques. Data is presented in Table 10. The compositions employed are described above and referred to in Table 10 by the Example numbers given above. A comparative example was made using a non-reinforced composition commercially available from GE Plastics under the tradename NORYL GTX 902.

TABLE 10

| Example No. | DOI |
|---|---|
| Example 13 | 92.6 |
| Example 25 | 88.7 |
| Example 42 | 91.3 |
| Example 49 | 91.9 |
| GTX902* | 93.0 |

*Comparative example

The DOI data show that a smooth and glossy painted finish comparable to a non-reinforced composition can be achieved using a reinforced composition.

In this specification and in the claims, which follow, reference will be made to a number of terms which shall be defined to have the following meanings. "Plastic materials" and "thermoplastic compositions" as used throughout this application and claims are synonymous and refer to compositions comprising polymers wherein the compositions can be melted, formed into an article, which, in turn, can be melted and formed into a different article. The terms "a" and "an" herein do not denote a limitation of quantity, but rather denote the presence of at least one of the referenced item. "Optional" or "optionally" means that the subsequently described event or circumstance may or may not occur, and that the description includes instances where the event occurs and instances where it does not. All ranges disclosed herein are inclusive and combinable (e.g., ranges of "up to 25 wt %, or, more specifically, 5 wt % to 20 wt %," is inclusive of the endpoints and all intermediate values of the ranges of "5 wt % to 25 wt %," etc.). The suffix "(s)" as used herein is intended to include both the singular and the plural of the term that it modifies, thereby including one or more of that term (e.g., the sample(s) includes one or more samples). Furthermore, as used herein, "combination" is inclusive of blends, mixtures, alloys, reaction products, and the like. Reference throughout the specification to "one embodiment", "another embodiment", "an embodiment", "some embodiments", and so forth, means that a particular element (e.g., feature, structure, property, and/or characteristic) described in connection with the embodiment is included in at least one embodiment described herein, and may or may not be present in other embodiments. In addition, it is to be understood that the described element(s) may be combined in any suitable manner in the various embodiments.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

All patents and patent publications cited herein are incorporated by reference in their entirety.

The invention claimed is:

1. A thermoplastic composition comprising:
   a compatibilized blend of poly(arylene ether) and polyamide;
   10 to 40 weight percent, based on the total weight of the composition, of a glass fiber; and
   an electrically conductive filler,
   wherein the compatibilized blend has a weight ratio of poly(arylene ether) to polyamide of 0.25 to 0.40, and
   wherein greater than 50 weight percent of the polyamide is polyamide-6.

2. The thermoplastic composition of claim 1, wherein greater than or equal to 75 weight percent of the polyamide is polyamide-6.

3. The thermoplastic composition of claim 1, wherein greater than or equal to 85 weight percent of the polyamide is polyamide-6.

4. The thermoplastic composition of claim 1, wherein greater than or equal to 95 weight percent of the polyamide is polyamide-6.

5. The thermoplastic composition of claim 1, wherein the composition has a specific volume resistivity that is 50% less than a volume resistivity of a comparable non-reinforced composition.

6. The thermoplastic composition of claim 1, wherein the composition has a specific volume resistivity of $1 \times 10^2$ ohm-cm to $6 \times 10^6$ ohm-cm.

7. The thermoplastic composition of claim 1, wherein the composition has a Notched Izod value of 5 to 75 kilojoules per square meter determined according to ISO 180/1A.

8. The thermoplastic composition of claim 1, wherein the composition has a Vicat softening temperature of 170° C. to 230° C. determined using ISO 306.

9. The thermoplastic composition of claim 1, wherein the composition has a tensile modulus of 3,500 to 15,000 MPa determined according to ISO 527-2.

10. The thermoplastic composition of claim 1, wherein the electrically conductive filler is selected from the group consisting of electrically conductive carbon black, carbon fibers, carbon nanotubes and combinations of two or more of the foregoing.

11. The thermoplastic composition of claim 1, wherein the composition further comprises an impact modifier.

12. The thermoplastic composition of claim 1, wherein the composition further comprises a particulate filler having an aspect ratio of less than or equal to 1.

13. A thermoplastic composition comprising:
a compatibilized blend of poly(arylene ether) and polyamide;
10 to 30 weight percent, based on the total weight of the composition, of glass fiber; and
an electrically conductive filler;
wherein the weight ratio of the combined weight of poly(arylene ether) and glass fiber to the weight of the polyamide is 0.5 to 0.9, and
wherein greater than 50 weight percent of the polyamide is polyamide-6.

14. The thermoplastic composition of claim 13, wherein greater than or equal to 75 weight percent of the polyamide is polyamide-6.

15. The thermoplastic composition of claim 13, wherein greater than or equal to 85 weight percent of the polyamide is polyamide-6.

16. The thermoplastic composition of claim 13, wherein greater than or equal to 95 weight percent of the polyamide is polyamide-6.

17. The thermoplastic composition of claim 13, wherein the composition has a volume resistivity that is at least 50% less than a volume resistivity of a comparable composition free of glass fiber.

18. The thermoplastic composition of claim 13, wherein the composition has a Notched Izod value of 5 to 75 kilojoules per square meter determined according to ISO 180/1A.

19. The thermoplastic composition of claim 13, wherein the composition has a Vicat softening temperature of 170° C. to 230° C. determined using ISO 306.

20. The thermoplastic composition of claim 13, wherein the composition has a tensile modulus of 3,500 to 15,000 MPa determined according to ISO 527-2.

21. The thermoplastic composition of claim 13, wherein the electrically conductive filler is selected from the group consisting of electrically conductive carbon black, carbon fibers, carbon nanotubes, and combinations of two or more of the foregoing.

22. The thermoplastic composition of claim 13, wherein the composition further comprises an impact modifier.

23. The thermoplastic composition of claim 13, wherein the composition further comprises a particulate filler having an aspect ratio of less than or equal to 1.

24. A thermoplastic composition comprising
50 to 90 weight percent, based on the total weight of the composition, of a compatibilized blend of poly(arylene ether) and polyamide 6;
0.2 to 2 weight percent, based on the total weight of the composition, of additives;
1 to 2 weight percent, based on the total weight of the composition, of an electrically conductive filler selected from the group consisting of electrically conductive carbon black, carbon fibers, carbon nanotubes, and combinations of two or more of the foregoing;
10 to 30 weight percent, based on the total weight of the composition, of glass fiber,
wherein the weight ratio of the combined weight of poly(arylene ether) and glass fiber to the weight of the polyamide is 0.5 to 0.9,
wherein greater than or equal to 95 weight percent of the polyamide is polyamide-6, and
wherein the composition has a tensile modulus of 3,500 to 15,000 MPa determined according to ISO 527-2.

25. The thermoplastic composition of claim 24, wherein the composition has a volume resistivity that is at least 50% less than a volume resistivity of a comparable composition free of glass fiber.

26. The thermoplastic composition of claim 24, wherein the composition has a Vicat softening temperature of 170° C. to 230° C.

27. The thermoplastic composition of claim 24, wherein the composition further comprises an impact modifier.

28. The thermoplastic composition of claim 24, wherein the composition has a Notched Izod value of 5 to 75 kilojoules per square meter determined according to ISO 180/1A.

29. The thermoplastic composition of claim 24, wherein the composition further comprises a particulate filler.

30. A thermoplastic composition comprising
50% to 90 weight percent, based on the total weight of the composition, of a compatibilized blend of poly(arylene ether) and polyamide 6;
0.2 to 2 weight percent, based on the total weight of the composition, of additives;
1 to 2 weight percent, based on the total weight of the composition, of an electrically conductive filler selected from the group consisting of electrically conductive carbon black, carbon fibers, carbon nanotubes, and combinations of two or more of the foregoing;
10 to 40 weight percent, based on the total weight of the composition, of glass fiber,
wherein the compatibilized blend has a weight ratio of poly(arylene ether) to polyamide of 0.25 to 0.40,
wherein greater than or equal to 95 weight percent of the polyamide is polyamide-6, and
wherein the composition has a tensile modulus of 3,500 to 15,000 MPa determined according to ISO 527-2.

31. The thermoplastic composition of claim 30, wherein the composition has a volume resistivity that is at least 50% less than a volume resistivity of a comparable composition free of glass fiber.

32. The thermoplastic composition of claim 30, wherein the composition has a Vicat softening temperature of 170° C. to 230° C.

33. The thermoplastic composition of claim 30, wherein the composition further comprises an impact modifier.

34. The thermoplastic composition of claim 30, wherein the composition has a Notched Izod value of 5 to 75 kilojoules per square meter determined according to ISO 180/1A.

35. The thermoplastic composition of claim 30, wherein the composition further comprises a particulate filler.

36. An article comprising:
a paint film; and
a thermoplastic section,
wherein the paint film is disposed on at least a portion of a thermoplastic section,
wherein the paint film has a thickness of 38 micrometers to 178 micrometers,
wherein the article has a distinctness of image of greater than or equal to 85, and
wherein the thermoplastic section is made from a thermoplastic composition comprising
a compatibilized blend of poly(arylene ether) and polyamide;
10 to 40 weight percent, based on the total weight of the composition, of a fiber; and
an electrically conductive filler,
wherein the compatibilized blend has a weight ratio of poly(arylene ether) to polyamide of 0.25 to 0.40;
wherein greater than 50 weight percent of the polyamide, based on the total weight of the polyamide, is polyamide-6.

37. The article of claim 36, wherein the article is an engine housing.

38. The article of claim 36, wherein greater than or equal to 75 weight percent of the polyamide is polyamide-6.

39. The article of claim 36, wherein greater than or equal to 95 weight percent of the polyamide is polyamide-6.

40. The article of claim 36, wherein the composition further comprises an impact modifier.

41. The article of claim 36, wherein the composition further comprises a particulate filler having an aspect ratio of less than or equal to 1.

42. An article comprising:
a paint film; and
a thermoplastic section,
wherein the paint film is disposed on at least a portion of a thermoplastic section,
wherein the paint film has a thickness of 38 micrometers to 178 micrometers,
wherein the article has a distinctness of image of greater than or equal to 85, and
wherein the thermoplastic section is made from a thermoplastic composition comprising
a compatibilized blend of poly(arylene ether) and polyamide;
10 to 30 weight percent, based on the total weight of the composition, of a glass fiber; and
an electrically conductive filler,
wherein the weight ratio of the combined weight of poly(arylene ether) and glass fiber to the weight of the polyamide is 0.5 to 0.9;
wherein greater than 50 weight percent of the polyamide, based on the total weight of the polyamide, is polyamide-6.

43. The article of claim 42, wherein the article is an engine housing.

44. The article of claim 42, wherein greater than or equal to 75 weight percent of the polyamide is polyamide-6.

45. The article of claim 42, wherein greater than or equal to 95 weight percent of the polyamide is polyamide-6.

46. The article of claim 42, wherein the composition further comprises an impact modifier.

47. The article of claim 42, wherein the composition further comprises a particulate filler having an aspect ratio of less than or equal to 1.

48. A method of improving the surface appearance of an unpainted article comprising:
injection molding a thermoplastic composition to form an unpainted article,
wherein the unpainted article has no visually detectable fiber read through at a distance of 1 meter in bright sunlight, and
wherein the thermoplastic composition comprises
a compatibilized blend of poly(arylene ether) and polyamide;
10 to 40 weight percent, based on the total weight of the composition, of a glass fiber; and
an electrically conductive filler,
wherein the compatibilized blend has a weight ratio of poly(arylene ether) to polyamide of 0.25 to 0.40; and
wherein greater than 50% weight percent of the polyamide, based on the total weight of the polyamide, is polyamide-6.

49. A method of improving the surface appearance of an unpainted article comprising:
injection molding a thermoplastic composition to form an unpainted article,
wherein the unpainted article has no visually detectable fiber read through at a distance of 1 meter in bright sunlight, and
wherein the thermoplastic composition comprises
a compatibilized blend of poly(arylene ether) and polyamide;
10 to 30 weight percent, based on the total weight of the composition, of a glass fiber; and
an electrically conductive filler,
wherein the weight ratio of the combined weight of poly(arylene ether) and glass fiber to the weight of the polyamide is 0.5 to 0.9; and
wherein greater than 50 weight percent of the polyamide, based on the total weight of the polyamide, is polyamide-6.

* * * * *